(12) United States Patent
Piaulet et al.

(10) Patent No.: US 10,059,235 B2
(45) Date of Patent: Aug. 28, 2018

(54) LOCKING DEVICE FOR AN ACTUATOR COMPRISING AN INERTIA LOCKING MEMBER

(71) Applicant: PGA ELECTRONIC, Montierchaume (FR)

(72) Inventors: Jean-Francois Piaulet, Deols (FR); Alain Berthouloux, Chateauroux (FR)

(73) Assignee: PGA ELECTRONIC, Montierchaume (FR)

( * ) Notice: Subject to any disclaimer, the term of this patent is extended or adjusted under 35 U.S.C. 154(b) by 311 days.

(21) Appl. No.: 14/773,281

(22) PCT Filed: Mar. 4, 2014

(86) PCT No.: PCT/EP2014/054178
§ 371 (c)(1),
(2) Date: Sep. 4, 2015

(87) PCT Pub. No.: WO2014/135540
PCT Pub. Date: Sep. 12, 2014

(65) Prior Publication Data
US 2016/0009204 A1    Jan. 14, 2016

(30) Foreign Application Priority Data

Mar. 7, 2013   (FR) ..................................... 1352053

(51) Int. Cl.
*B60N 2/44*     (2006.01)
*B60N 2/22*     (2006.01)
*B60N 2/90*     (2018.01)

(52) U.S. Cl.
CPC ........... *B60N 2/444* (2013.01); *B60N 2/2227* (2013.01); *B60N 2/2245* (2013.01); *B60N 2/938* (2018.02); *B60N 2002/924* (2018.02)

(58) Field of Classification Search
CPC ..................................................... B60N 2/444
See application file for complete search history.

(56) References Cited

U.S. PATENT DOCUMENTS

| 5,074,053 A | 12/1991 | West et al. |
| 6,230,867 B1 * | 5/2001 | Schwarzbich ......... B60N 2/167 192/15 |

(Continued)

FOREIGN PATENT DOCUMENTS

| DE | 23 23 640 A1 | 12/1973 |
| DE | 199 16 361 A1 | 10/1999 |

(Continued)

OTHER PUBLICATIONS

French Preliminary Search Report for FR 13 52053 dated Nov. 27, 2013.

(Continued)

*Primary Examiner* — David R Dunn
*Assistant Examiner* — Tania Abraham
(74) *Attorney, Agent, or Firm* — Pearne & Gordon LLP

(57) ABSTRACT

A locking device for an actuator, characterized in that it comprises a stationary ring that has an inner wall, a movable wheel comprising a cavity formed on the outer wall of the wheel opposite the inner wall of the ring, an inertia locking member located in the cavity, a resilient drawback member exerting a force on the locking member, the latter able by the inertia thereof to overcome the force exerted by the resilient drawback member to allow for the locking of the wheel via a wedging effect of the locking member between the cavity and the inner wall of the ring.

11 Claims, 2 Drawing Sheets

(56) References Cited

U.S. PATENT DOCUMENTS

| | | | |
|---|---|---|---|
| 6,273,233 B1 * | 8/2001 | Denis | B60N 2/2257 |
| | | | 192/223.2 |
| 6,334,651 B1 * | 1/2002 | Duan | B60N 2/444 |
| | | | 297/284.1 |
| 8,954,239 B2 | 2/2015 | Piaulet et al. | |
| 2008/0255788 A1 | 10/2008 | Muhammad et al. | |

FOREIGN PATENT DOCUMENTS

| | | |
|---|---|---|
| EP | 0 169 096 A1 | 1/1986 |
| EP | 1 103 412 A1 | 5/2001 |
| EP | 1 298 508 A1 | 4/2003 |
| FR | 2 350 982 A1 | 12/1977 |
| FR | 2 736 879 A1 | 1/1997 |

OTHER PUBLICATIONS

International Search Report for PCT Application No. PCT/EP2014/054178 dated Apr. 15, 2014.
Office Action dated Oct. 7, 2016, U.S. Appl. No. 14/413,699, 15 pages.
French Search Report for France Application No. 1256580 dated May 8, 2013. (Cited references are in English).
International Search Report and Written Opinion for PCT Application No. PCT/EP2013/064463 dated Oct. 7, 2013.

* cited by examiner

LOCKING DEVICE FOR AN ACTUATOR COMPRISING AN INERTIA LOCKING MEMBER

CROSS-REFERENCE TO RELATED PATENT APPLICATION

The present application is a National Stage Application of International Application No. PCT/EP2014/054178 entitled "LOCKING DEVICE FOR AN ACTUATOR COMPRISING AN INTERTIA LOCKING MEMBER" filed Mar. 4, 2014, which claims priority to French Patent Application Number 13 52053 filed Mar. 7, 2013, the contents of which are incorporated herein by reference in their entirety.

TECHNICAL FIELD

This invention relates to the field of systems for locking a seat in position. It also relates to the field of actuators that make it possible to modify the position of movable elements, in particular seat elements.

The invention relates more specifically to a locking device for an actuator, an actuator comprising such a device as well as a method for locking an actuator.

The invention has applications in all of the fields that make use of actuators for the displacement of movable elements, and in particular elements of a seat. In particular, the invention can apply to seats intended for transport vehicles, such as aircraft, boats and railway cars, and even for example to medical seats.

PRIOR ART

In order to be able to modify the position of a user installed on a seat according to his desires or imposed circumstances, it is known to provide the seats with electric actuating devices that make it possible to vary the configurations of the seat by displacement of movable seat elements.

A seat can for example comprise seat elements such as a reclining seatback articulated to an end of a seat base and a leg rest articulated to the other end of the seat base. The configuration of each seat element can be modified by the intermediary of an actuating device able to control, independently or simultaneously, the displacement of actuators placed on the seat elements.

Moreover, due to the particular circumstances applied to a seat, it is often desirable to provide the seat with a system for locking in position, generally in the landing position for an aircraft seat. Blocking the seat in position can for example be desired in order to resist the impacts that the seat is subjected to, in particular during crash tests.

Two types of mechanisms for locking an aircraft seat in position according to prior art are known in particular, designed especially to resist the conditions imposed on the seat during an impact.

The first type of mechanisms for locking is a mechanism built into the seat and independent of the actuators installed in the seat. It generally comprises electromagnets coupled to a system for locking the seat when the latter is in a safety position, typically the landing position. An electric control of the electromagnets is required in order to move out of the safety position while to return to this position the locking is carried out automatically.

The second type of mechanisms for locking is linked to the structure of the seat, and more specifically to the kinematics of the seat. The mechanism is automatically locked when the seat returns to the safety position and is unlocked when the seat leaves this position. It therefore does not use any electric control for the locking.

These existing solutions of prior art not entirely satisfactory. On the one hand, the use of a system for locking operating using electrical parts results in over-sizing of electrical power use in order to provide the power required for the mechanism. On the other hand, the location of the mechanisms for locking on the seat complicates the design on the seat and the management of the movements of the seat, and this thus results in a high cost.

Moreover, patent applications DE 19916361 A1, FR 2350982 A1, DE 2323640 A1 and EP 0169096 A1 further describe other systems for locking according to prior art.

DISCLOSURE OF THE INVENTION

There is as such a need to propose a new device for locking a seat in position, and in particular a new location of the locking device.

There is also a need to design a new locking device for an actuator, in particular an actuator for the displacement of a seat element.

The invention has for purpose to overcome at least partially the needs mentioned hereinabove and the disadvantages relating to embodiments of prior art.

The invention as such has for object, according to one of its aspects, a locking device for an actuator, in particular an actuator of a seat, in particular an aircraft seat, characterised in that it comprises:
  a stationary ring that has an inner wall and an outer wall,
  a movable wheel in rotation with respect to the ring and placed coaxially inside the ring, with the wheel comprising an opening intended to allow for the passage of a pivoting shaft, in particular a pivoting shaft integral with an element to be locked, and at least one cavity formed on the outer wall of the wheel opposite the inner wall of the ring,
  at least one inertia locking member located in said at least one cavity of the wheel,
  at least one resilient drawback member exerting a force on said at least one locking member in order to maintain it in position and allow for the rotation of the wheel, said at least one locking member being able by the inertia thereof to overcome, in particular in the case of an impact, the force exerted by said at least one resilient drawback member in order to allow for the locking of the wheel by a wedging effect of said at least one locking member between said at least one cavity, in particular the bottom wall of said at least one cavity, and the inner wall of the ring.

The element to be locked can be an element to be actuated by the actuator, in particular a seat element, for example the reclining seatback of the seat. The ring can be stationary with respect to the element to be locked.

The wheel of the locking device can be linked in rotation to the pivoting shaft. In this way, the locking of the wheel can result in the locking of the pivoting shaft, and therefore the maintaining in position of the element to be locked which is integral with the pivoting shaft.

The ring can be similar to a collar, and the wheel can be similar to a hub.

Thanks to the invention, the locking device may no longer be integrated on the seat but directly on an actuator allowing for the movement of the seat. In this way, the invention can make it possible to simplify the study of the kinematics of the seat, to reduce the weight and the encumbrance of the seat, and to limit manufacturing costs. Furthermore, the locking device can be able to resist impacts that the seat is subjected to, in particular during crash tests. The locking device according to the invention can moreover have an operation that is entirely mechanical, and therefore not generate any overconsumption of electricity. The electrical management of the seat can as such be simplified. Finally, the programming and/or the calibration of the seat can also be made easier.

The locking device according to the invention can further comprise one or several of the following characteristics taken individually or in any technically permissible combination.

The wheel can advantageously be placed inside the ring in such a way that the outer wall of the wheel is opposite the inner wall of the ring.

The cavity can comprise a bottom wall and two lateral edges.

The cavity can be similar to a notch formed on the outer wall of the wheel. The cavity can substantially have the shape of a U.

The distance between the inner wall of the ring and the bottom wall of the cavity, in particular a first portion and/or a second portion of the bottom wall, can be variable. In particular, this distance can decrease in the direction of at least one of the lateral edges of the cavity, in particular the two lateral edges of the cavity.

The locking member is able to be in a first position wherein the distance between the bottom wall of the cavity and the inner wall of the ring is greater than the radial dimension of the locking member, with the locking member being in this first position maintained by the force exerted by the resilient drawback member.

Furthermore, the locking member can be able to be in a second position wherein the distance between the bottom wall, in particular a first portion and/or a second portion of the bottom wall, of the cavity and the inner wall of the ring is substantially equal to the radial dimension of the locking member, with the locking member being in this second position locked between the bottom wall, in particular the first portion and/or the second portion of the bottom wall, of the cavity and the inner wall of the ring in such a way as to allow for the locking of the wheel by a wedging effect. In other words, when the locking member manages to overcome by inertia the force exerted by the resilient drawback member in the first position, it can be positioned in the second position and be locked between the bottom wall of the cavity and the inner wall of the ring in order to lock the rotation of the wheel.

The cavity can comprise a first portion, in particular a central portion, on which the radial dimension of the locking member is less than the distance between the bottom wall of the cavity and the inner wall of the ring. The locking member can as such be in the first position on this first portion.

Moreover, the cavity can comprise a second portion, in particular in the vicinity of at least one of the edges of the cavity, on which the distance between the bottom wall of the cavity and the inner wall of the ring is substantially equal to the radial dimension of the locking member. The locking member can as such be in the second position on this second portion.

The cavity can comprise a bottom wall in the shape of a V, formed in particular by the first portion and the second portion of the bottom wall. In this way, the wedging effect can be improved. The bottom wall can in particular comprise a first portion and a second portion, in particular symmetrical to one another with respect to the radius of the wheel, that converge towards the inner wall of the ring by moving towards the lateral edges of the cavity.

The wheel can comprise more than one cavity, for example two cavities, or more preferably three and even four cavities, each housing a locking member.

In particular, the wheel can comprise at least three cavities formed on the outer wall of the wheel, and the device can comprise at least three inertia locking members respectively located in the three cavities, with each locking member being maintained in position by at least one resilient drawback member.

The resilient drawback member can be formed by any type of elastic means. In particular, the resilient drawback member can be a spring.

The resilient drawback member can be located in the cavity. In particular, the resilient drawback member can extend from a lateral edge of the cavity.

The locking member can therefore be maintained in position in the cavity between the resilient drawback member and a lateral edge of the cavity.

Alternatively, two resilient drawback members can each exert a force on the locking member, on either side of the locking member. In particular, the two resilient drawback members can extend respectively from the lateral edges of the cavity. As such, the locking member can be maintained in position in the cavity between the two resilient drawback members.

Using two resilient drawback members in the same cavity in order to maintain in position the locking member can allow for the locking of the device in the two directions of rotation of the wheel.

The locking member can have a circular shape. In particular, the locking member can have the shape of a disc. The locking member can for example be a roller.

The inertia of the locking member that makes it possible to overcome the force exerted by the resilient drawback member can be determined according to the mass of the locking member.

The wedging effect of the locking member between the cavity and the inner wall of the ring can be comparable to a wedge effect or a bracing effect.

The invention further has for object, according to another of its aspects, an actuator, in particular an actuator for the displacement of an element to be actuated, in particular a seat element, characterised in that it comprises a locking device such as defined hereinabove.

The locking device can be located at the output of the actuator, for example in order to allow mechanical elements of the actuator placed upstream to not be subjected to the impacts.

The invention further has for object, according to another of its aspects, a method for locking an actuator that allows for the displacement of an element to be actuated, in particular a seat element, characterised in that it is implemented by means of the locking device such as defined hereinabove, and in that it comprises a step of locking consisting in locking the element to be actuated via the inertia effect of said at least one inertia locking member.

The locking of the element to be actuated can be obtained by the intermediary of the inertia of the locking member and under the wedging effect of the locking element, also called wedge effect or bracing effect.

The step of locking can be implemented only when the actuator is subjected to particular operating conditions, in particular when the actuator is subjected to crash tests.

The step of locking can in particular be implemented under an acceleration greater than or equal to 1 g and more preferably less than or equal to 24 g, for example between 9 and 16 g.

The step of locking can be of short duration, for example less than 0.1 s. In any case, the duration of the locking remains linked to the value of the acceleration and to the total weight of the mass in movement, namely that of the movable portion of the seat and of the passenger.

The step of locking can allow for the locking of the element to be actuated in both of its directions of displacement, in particular in its two directions of rotation.

The invention further has for object, according to another of its aspects, a seat, characterised in that it comprises an actuator such as defined hereinabove.

The seat can be of any type. In particular, the seat can for example be a seat intended for transport vehicles, such as aircraft, boats and railway cars, and even for example a medical seat.

The seat can for example comprise a first seat element that can be moved with respect to a second seat element by means of at least one actuator according to the invention.

The first seat element can for example be the reclining seatback of the seat. The second seat element can for example be the seat base of the seat.

The seat can again comprise a movable seat element that can be moved with respect to a stationary seat element, in particular the floor whereon the seat is placed, by means of at least one actuator according to the invention. This possibility of displacement between the movable seat element and the stationary seat element, corresponding in particular to the floor of the seat, is known by the name of tracking.

The first seat element can be integral with the pivoting shaft linked in rotation to the wheel of the locking device according to the invention.

The actuator, the method of locking and the seat according to the invention can comprise any one of the aforementioned characteristics, taken individually or according to any technically permissible combinations with other characteristics.

BRIEF DESCRIPTION OF THE DRAWINGS

The invention can be understood better when reading the following detailed description, of a non-restricted embodiment of the latter, as well as when examining the figures of the annexed drawing, diagrammatical and partial, wherein.

In all of these figures, identical references can designate identical or similar elements.

In addition, the various portions shown in the figures are not necessarily shown according to a uniform scale, in order to make the figures easier to read.

DETAILED DISCLOSURE OF A PARTICULAR EMBODIMENT

Figure 1:
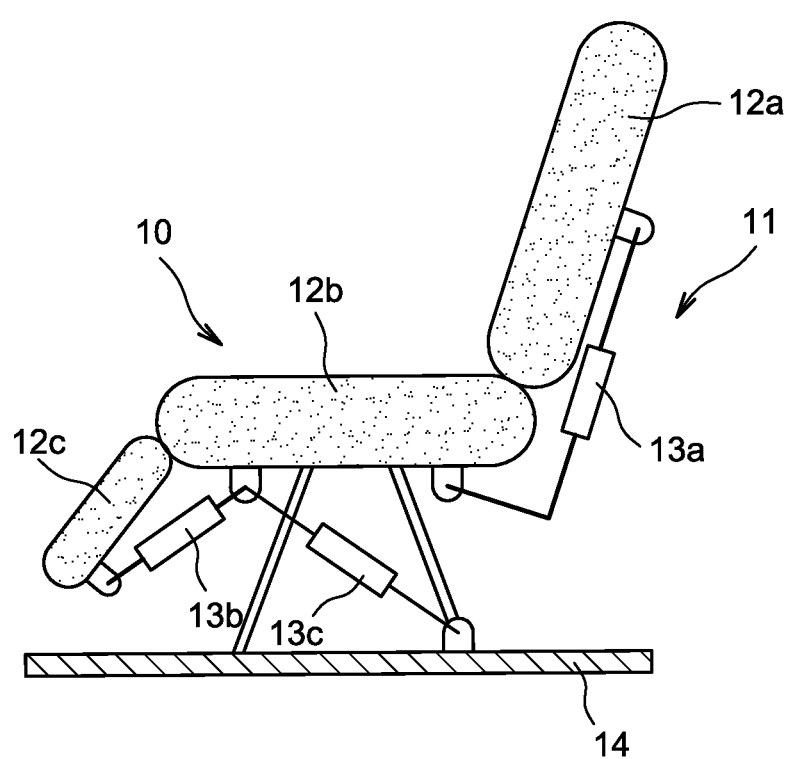
FIG. 1 shows an example of a seat provided with actuators that can comprise a locking device according to the invention.

In reference to FIG. 1, an example of a seat 10 is shown, for example an aircraft seat, comprising three elements to be actuated 12a, 12b, 12c in the form of seat elements.

The seat elements 12a, 12b, 12c correspond for example to a reclining seatback 12a, a seat base 12b and a leg rest 12c.

The seat elements 12a, 12b, 12c of the seat 10 can be displaced in order to modify the configuration of use of the seat 10 by means of an actuating device 11 comprising actuators 13a, 13b, 13c.

A first actuator 13a can for example allow for a displacement between the reclining seatback 12a and the seat base 12b. A second actuator 13b can for example allow for a displacement between the seat base 12b and the leg rest 12c. Finally, a third actuator 13c can for example allow a displacement between the seat elements 12a, 12b, 12c mobiles and a stationary seat element, in particular the floor 14 of the aircraft whereon the seat 10 is placed. This latter movement is known under the name of tracking.

As indicated hereinabove, the seat 10 can be provided with actuators provided with a system for locking to be able to resist particular constraints applied to the seat 10, in particular impacts that the seat is subjected to during crash tests. The seat 10 can as such be locked in a secure manner, in particular in the landing position thereof.

To do this, the actuators 13a, 13b, 13c can comprise a locking device 1 according to the invention, as is described hereinafter.

In particular, it can be advantageous to provide such a locking device 1 on the third actuator 13c connected to the floor 14, and even solely on this actuator 13c, as it is on the movement of the latter where the weight is the greatest as it comprises the weight of the seat elements 12a, 12b, 12c and the weight of the passenger.

Figure 2:
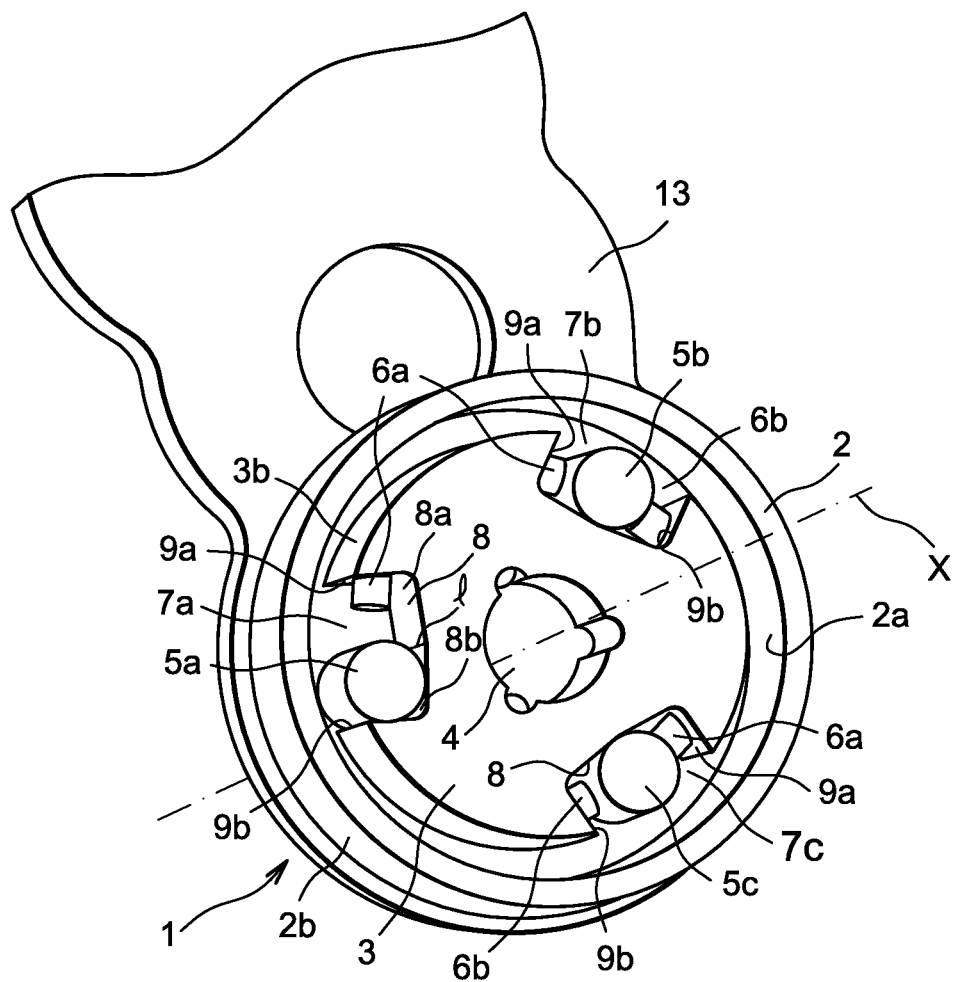
FIG. 2 shows an example of an actuator comprising a locking device according to the invention.

FIG. 2 thus shows an example of a locking device 1 according to the invention for an actuator 13, in particular a seat actuator, for example one of the actuators 13a, 13b and 13c shown in FIG. 1.

The locking device 1 can for example be used for the self-locking in pivoting of a seat element with respect to another, in particular in the case of abrupt acceleration during an impact, for example for the locking of the leg rest 12c with respect to the seat base 12b and/or the reclining seatback 12a with respect to the seat base 12b, or even for the blocking of at least one of the reclining seatback 12a, the seat base 12b and the leg rest 12c with respect to the floor 14.

The locking device 1 comprises a stationary ring 2 with respect to a seat element to be actuated by the actuator 13, with this seat element being integral with a pivoting shaft with a main axis X.

The ring 2 has an inner wall 2a towards the X axis and an outer wall 2b opposite the inner wall 2a.

Moreover, the locking device 1 comprises a wheel 3 mobile in rotation with respect to the ring 2. The wheel 3 is placed coaxially according to the axis X of rotation of the pivoting shaft inside the ring 2.

The wheel 3 comprises an opening 4 in order to allow for the passage of the pivoting shaft.

Furthermore, the wheel 3 comprises three cavities 7a, 7b and 7c formed on the outer wall 3b of the wheel 3 opposite the inner wall 2a of the ring 2, with these three cavities 7a, 7b and 7c being evenly distributed on the outer wall 3b of the wheel 3.

Each cavity 7a, 7b and 7c substantially has the shape of a U. Each cavity comprises a bottom wall 8 and two lateral edges 9a and 9b on either side of the bottom wall 8.

More specifically, the bottom wall 8 comprises a first portion 8a and a second portion 8b on either side of a median line 1 of the bottom wall 8, with these first 8a and second 8b portions being symmetrical to one another with respect to the radius of the wheel 3 and converging towards the inner wall 2a of the ring 2 by moving towards the lateral edges 9a and 9b of the cavity.

As such, the bottom wall 8 of each cavity substantially has the shape of a V. This characteristic can make it possible to improve the wedging effect of the locking member.

The locking device 1 further comprises three locking members 5a, 5b and 5c in the form of rollers.

The three rollers 5a, 5b and 5c are respectively placed in the cavities 7a, 7b and 7c, between the bottom wall 8 of each cavity and the inner wall 2a of the ring 2.

Moreover, the locking device 1 comprises six resilient drawback members 6a, 6b in the form of springs.

More precisely, each cavity 7a, 7b and 7c comprises two springs 6a and 6b, extending respectively from the edges 9a and 9b of the cavity.

In the example shown, the rollers 5b and 5c of the cavities 7b and 7c are maintained in position by the resilient drawback forces exerted by the springs 6a and 6b on either side of the rollers 5b and 5c. This positioning of the rollers 5b and 5c maintained by the forces exerted by the springs 6a and 6b can allow for the rotation of the wheel 3.

However, the roller 5a located in the cavity 7a is in a position that drives the locking of the wheel 3. Indeed, the configuration of the roller 5a on the cavity 7a shows a position of the roller 5a wherein the latter, by the inertia thereof, has overcome the force exerted by the spring 6b that extends from the lateral edge 9b of the cavity 7a in such a way that the roller 5a has moved from a first position wherein it was maintained in position by the two springs 6a and 6b into a second position wherein it is in contact with the lateral edge 9b of the cavity 7a, wedged between the bottom wall 8, in particular the second portion 8b of the bottom wall 8, of the cavity 7a and the inner wall 2a of the ring 2. The wedging effect (or bracing effect) obtained as such allows for the locking of the wheel 3, and therefore the blocking of the seat element integral with the pivoting shaft.

The distance that separates the inner wall 2a of the ring 2 from the bottom wall 8 of the cavity 7a is greater than the radial dimension of the roller 5a in the central portion of the cavity 7a, on the medial line 1, then decreases by moving in the vicinity of the lateral edges 9a and 9b of the cavity 7a in such a way as to be substantially equal to the radial dimension of the roller 5a. As such, the displacement of the roller 5a towards the lateral edge 9b of the cavity 7a generates the wedging effect and the locking in rotation of the wheel 3.

The displacement of the roller 5a is made possible by the inertia of the latter. More particularly, the roller 5a is able by the inertia thereof to overcome the force exerted by the spring 6b during in particular a strong acceleration applied to the seat, for example during crash tests. The mass of the locking element can be adapted according to the wedging effect sought during the locking.

Of course, the invention is not limited to the embodiment that has just been described.

In particular, the locking device 1 could comprise more than three locking members and more than three cavities, for example four locking members associated with four cavities formed on the outer wall 3b of the wheel 3.

The expression "comprising a" must be understood as being synonymous with "comprising at least one", unless mentioned otherwise.

The invention claimed is:
1. Device for locking for an actuator, comprising:
a stationary ring that has an inner wall and an outer wall,
a movable wheel in rotation with respect to the ring and placed coaxially inside the ring, the wheel comprising an opening intended to allow for the passage of a pivoting shaft and at least one cavity formed on the outer wall of the wheel opposite the inner wall of the ring,
at least one inertia locking member located in said at least one cavity of the wheel,
at least one resilient drawback member exerting a force on said at least one inertia locking member in order to maintain it in position and allow for the rotation of the wheel,
said at least one inertia locking member being able by an inertia thereof to overcome the force exerted by said at least one resilient drawback member to allow for the locking of the wheel by a wedging effect of said at least one inertia locking member between said at least one cavity and the inner wall of the ring,
wherein said at least one cavity comprises a bottom wall, wherein said at least one inertia locking member is able to be in a first position wherein the distance between the bottom wall of said at least one cavity and the inner wall of the ring is greater than the radial dimension of said at least one inertia locking member, said at least one inertia locking member being in this first position maintained by the force exerted by said at least one resilient drawback member, and wherein said at least one inertia locking member is able to be in a second position wherein the distance between the bottom wall, of said at least one cavity and the inner wall of the ring is substantially equal to the radial dimension of said at least one inertia locking member, said at least one inertia locking member being in this second position locked between the bottom wall, of said at least one cavity and the inner wall of the ring in such a way as to allow for the locking of the wheel via a wedging effect.

2. Device according to claim 1, wherein said at least one cavity comprises a bottom wall and two lateral edges, and wherein the distance between the inner wall of the ring and the bottom wall, of said at least one cavity is variable, with this decreasing in the direction of at least one of the lateral edges of said at least one cavity.

3. Device according to claim 1, wherein said at least one cavity comprises a bottom wall in the shape of a V, formed by a first portion and a second portion of the bottom wall.

4. Device as claimed in claim 1, wherein the wheel comprises at least three cavities formed on the outer wall of the wheel, and wherein the device comprises at least three inertia locking members respectively located in the three cavities, with each inertia locking member being maintained in position by at least one resilient drawback member.

5. Device as claimed in claim 1, wherein said at least one cavity comprises two lateral edges, and wherein said at least one resilient drawback member is located in said at least one cavity and extends from a lateral edge of said at least one cavity.

6. Device as claimed in claim 1, wherein two resilient drawback members each exert a force on said at least one inertia locking member, on either side of said at least one inertia locking member.

7. Device as claimed in claim 1, wherein said at least one inertia locking member is a roller.

8. Actuator comprising a locking device, said locking device including
a stationary ring that has an inner wall and an outer wall, a movable wheel in rotation with respect to the ring and placed coaxially inside the ring, the wheel comprising an opening intended to allow for the passage of a pivoting shaft and at least one cavity formed on the outer wall of the wheel opposite the inner wall of the ring, at least one inertia locking member located in said at least one cavity of the wheel, and at least one resilient drawback member exerting a force on said at least one inertia locking member in order to maintain it in position and allow for the rotation of the wheel, said at least one inertia locking member being able by an inertia thereof to overcome the force exerted by said at least one resilient drawback member to allow for the locking of the wheel by a wedging effect of said at least one inertia locking member between said at least one cavity and the inner wall of the ring, wherein said at least one cavity comprises a bottom wall, wherein said at least one inertia locking member is able to be in a first position wherein the distance between the bottom wall of said at least one cavity and the inner wall of the ring is greater than the radial dimension of said at least one inertia locking member, said at least one inertia locking member being in this first position maintained by the force exerted by said at least one resilient drawback member, and wherein said at least one inertia locking member is able to be in a second position wherein the distance between the bottom wall, of said at least one cavity and the inner wall of the ring is substantially equal to the radial dimension of said at least one inertia locking member, said at least one inertia locking member being in this second position locked between the bottom wall, of said at least one cavity and the inner wall of the ring in such a way as to allow for the locking of the wheel via a wedging effect.

9. Method for locking an actuator that allows for displacement of an element to be actuated, said method comprising steps of:

providing a locking device, the locking device comprising:

a stationary ring that has an inner wall and an outer wall, a movable wheel in rotation with respect to the ring and placed coaxially inside the ring, the wheel comprising an opening intended to allow for the passage of a pivoting shaft and at least one cavity formed on the outer wall of the wheel opposite the inner wall of the ring, at least one inertia locking member located in said at least one cavity of the wheel, and at least one resilient drawback member exerting a force on said at least one inertia locking member in order to maintain it in position and allow for the rotation of the wheel, said at least inertia one locking member being able by an inertia thereof to overcome the force exerted by said at least one resilient drawback member to allow for the locking of the wheel by a wedging effect of said at least one inertia locking member between said at least one cavity and the inner wall of the ring, wherein said at least one cavity comprises a bottom wall, wherein said at least one inertia locking member is able to be in a first position wherein the distance between the bottom wall of said at least one cavity and the inner wall of the ring is greater than the radial dimension of said at least one inertia locking member, said at least one inertia locking member being in this first position maintained by the force exerted by said at least one resilient drawback member, and wherein said at least one inertia locking member is able to be in a second position wherein the distance between the bottom wall, of said at least one cavity and the inner wall of the ring is substantially equal to the radial dimension of said at least one inertia locking member, said at least one inertia locking member being in this second position locked between the bottom wall, of said at least one cavity and the inner wall of the ring in such a way as to allow for the locking of the wheel via a wedging effect; and locking the element to be actuated via the inertia effect of said at least one inertia locking member.

10. Seat comprising an actuator, said actuator including a stationary ring that has an inner wall and an outer wall, a movable wheel in rotation with respect to the ring and placed coaxially inside the ring, the wheel comprising an opening intended to allow for the passage of a pivoting shaft and at least one cavity formed on the outer wall of the wheel opposite the inner wall of the ring, at least one inertia locking member located in said at least one cavity of the wheel, and at least one resilient drawback member exerting a force on said at least one inertia locking member in order to maintain it in position and allow for the rotation of the wheel, said at least one inertia locking member being able by an inertia thereof to overcome the force exerted by said at least one resilient drawback member to allow for the locking of the wheel by a wedging effect of said at least one inertia locking member between said at least one cavity and the inner wall of the ring, wherein said at least one cavity comprises a bottom wall, wherein said at least one inertia locking member is able to be in a first position wherein the distance between the bottom wall of said at least one cavity and the inner wall of the ring is greater than the radial dimension of said at least one inertia locking member, said at least one inertia locking member being in this first position maintained by the force exerted by said at least one resilient drawback member, and wherein said at least one inertia locking member is able to be in a second position wherein the distance between the bottom wall, of said at least one cavity and the inner wall of the ring is substantially equal to the radial dimension of said at least one inertia locking member, said at least one inertia locking member being in this second position locked between the bottom wall, of said at least one cavity and the inner wall of the ring in such a way as to allow for the locking of the wheel via a wedging effect.

11. The seat according to claim 10, further comprising a movable seat element that can be moved with respect to a stationary seat element by means of said actuator.

* * * * *